United States Patent [19]

Brown et al.

[11] Patent Number: 4,499,140

[45] Date of Patent: Feb. 12, 1985

[54] PRESSURE-SENSITIVE TRANSFER ELEMENTS AND METHOD

[75] Inventors: Albert E. Brown, Locust Valley; Robert T. Emerson, Manhasset, both of N.Y.

[73] Assignee: Leedall Products Incorporated, New York, N.Y.

[21] Appl. No.: 586,116

[22] Filed: Mar. 5, 1984

[51] Int. Cl.[3] .............................................. B32B 5/18

[52] U.S. Cl. ................................ 428/308.4; 427/153; 427/398.1; 428/317.1; 428/317.7; 428/319.7; 428/321.3; 428/914

[58] Field of Search ............................ 427/153, 398.1; 428/308.4, 317.7, 317.1, 319.7, 321.3, 914

[56] References Cited

U.S. PATENT DOCUMENTS

| | | | |
|---|---|---|---|
| 3,520,713 | 7/1970 | Sala | 427/153 |
| 3,628,979 | 12/1971 | Newman | 428/321.13 |
| 3,689,301 | 9/1972 | Scott et al. | 428/321.3 |
| 4,150,187 | 4/1979 | Brown | 427/153 |
| 4,427,739 | 1/1984 | Kohle | 428/321.3 |

FOREIGN PATENT DOCUMENTS

| | | | |
|---|---|---|---|
| 54-152512 | 11/1979 | Japan | 428/321.3 |

*Primary Examiner*—Norman Morgenstern
*Assistant Examiner*—Janyce A. Bell

[57] ABSTRACT

Method for producing novel multiple use pressure-sensitive transfer elements in the absence of volatile coating vehicles. The invention comprises preparing a molten coating composition including a compatible binder material mixture of hard wax and meltable synthetic resin, and a fluid ink comprising a solution of dyestuff in an oleaginous vehicle which is substantially incompatible with said wax and substantially compatible with said synthetic resin, coating said mixture onto a thin flexible foundation such as a plastic film and cooling to form a solidified cohesive microporous network of said binder material having uniformly dispersed within the pores thereof said fluid ink. Said ink is pressure-transferable from said network incrementally under the effects of imaging pressure along with that surface portion of the binder material network which is pressure-adhered to the copy sheet under the effects of the imaging pressure.

12 Claims, No Drawings

PRESSURE-SENSITIVE TRANSFER ELEMENTS AND METHOD

BACKGROUND OF THE INVENTION

The present invention relates to improvements in the field of reuseable or squeeze-out carbons and ribbons.

Reuseable or multiple use carbons, invented over twenty years ago as improvements over conventional hot-melt wax carbons, are produced by mixing a resinous binder material dissolved in a major amount of one or more volatile solvents or vehicles, and an oily ink which is incompatible with said resinous binder material, coating said mixture onto a flexible foundation and evaporating the solvents or vehicles to form a cohesive, nonadhesive porous network of said resin containing said ink within the pores thereof.

Such reuseable carbons represented an improvement over conventional hot-melt wax carbons in several regards. Firstly, they could be reused many times, with only a gradual weakening of the color of the images with each repeated use. Conventional hot-melt wax carbons have high adhesion and low cohesion properties and can be reused only a few times. The soft wax compositions are frangible and transfer as a solid mass in image form under each imaging pressure, including the wax binder, due to the low cohesive properties thereof. The intensity of the formed images is sharply reduced after the first use and is noticeably nonuniform in the case of images formed from areas of the carbon comprising overlapping new and used areas. Modern high-speed printers or typewriters operate on the so-called "multistrike" principal in order to reduce the length of ribbon used therein. Thus, the ribbon advancement speed is slowed so that each impact of the type face overlaps with one or more prior impacts. Thus, each typed or printed image is transferred from an area of the ribbon which has already transferred ink to one or more previous images. A conventional hot-melt typewriter carbon or film ribbin is unsatisfactory for such use because too large a portion of the ink composition is transferred under a single impact pressure. Subsequent images formed from overlapping areas of the same carbon or ribbon are clearly visible spotty or discontinuous. Multistrike use requires that at least about three, and preferably five or more, original-appearing images be produced fom each overstruck area of the carbon or ribbon. Conventional reuseable squeeze-out solvent carbons fill this requirement whereas conventional hot-melt typewriter carbons do not.

Secondly, reuseable or squeeze-out carbons produce images which are smear-resistant and clean-to-the-touch since such images comprise fluid ink which is absorbed by the copy paper. Conventional hot-melt wax carbons produce images which can be smeared and are dirty-to-the-touch since they comprise large amounts of softened or plasticized pigmented wax binder material in the form of solid raised images sitting on the surface of the copy paper.

While reuseable, squeeze-out carbons and ribbons represent a substantial advance in the art, they also have disadvantages. The volatile coating solvents or vehicles are expensive and are lost during the manufacturing process unless expensive solvent-recovery equipment is employed. Many of the conventional coating solvents or vehicles can no longer be used because they are classified as pollutants and/or as carcinogens or toxic chemicals. The solvent-coating equipment is expensive and requires a large amount of floor space due to the length of the necessary drying tunnel, etc. Also, solvent-coating processes cannot be carried out in certain areas, building or neighborhoods where precluded by fire laws designed for protection against fire and explosion.

It has been proposed to produce reuseable, squeeze-out carbons from plastisol formulations which comprise liquid resin binder-plasticizer materials which fuse at elevated temperatures to form microporous, ink-releasing coatings. While such formulations are useful for making stamp pads and ink rolls, they are unsuitable for use on thin paper or plastic films due to the high temperature of fusion.

In addition to the foregoing problems and disadvantages, some conventional reuseable, squeeze-out carbons and ribbons have a relatively high threshold of imaging pressure which must be exceeded before ink is exuded to a copy sheet. Some conventional typing and printing machines, such as the so-called Daisy wheel machine, exert a relatively low impact pressure. Other typing and printing machines are adjustable relative to their impact pressure. It is desirable for the carbons and ribbons to have a low threshold of imaging pressure, for use on machines having or adjusted to have relatively low impact pressures since such machines operate more quietly and generate less heat and wear than machines which exert higher impact pressures.

Also, conventional squeeze-out solvent carbons generally contain solid pigments rather than dissolved dyes, because of the relatively poor dye-dissolving ability of the resin-incompatible oleaginous ink vehicles therein, which makes it difficult to produce such carbons and ribbons having a variety of different-colored inks.

Conventional squeeze-out solvent carbons also have relatively poor transferability to copy sheets having rough or porous surfaces since the exuded ink only wets or stains the portions of the copy sheet contacted thereby. Thus, images formed on rough surfaces may be spotty, discontinuous and less clear or sharp than desired.

Finally, conventional solvent-coated, resin-base, reuseable carbons and ribbons require the presence of an adhesive or soluble bonding layer between the microporous ink layer and the plastic film foundation in order to prevent the ink layer from separating from the foundation during repeated reuse. Such bonding layers increase the cost and thickness of the carbons and ribbons and necessitate an additional coating step in the manufacturing process.

SUMMARY OF THE INVENTION

The present invention is based upon the discovery that it is possible, through the use of the proper formulations and manufacturing techniques, to produce reuseable, squeeze-out transfer elements suitable for use in multistrike machines by the hot-melt coating process, thereby avoiding the problems, disadvantages, expense and dangers inherent in the use of volatile coating solvents or vehicles, particularly organic solvents and vehicles. In addition, the present invention provides reuseable, squeeze-out transfer elements which require no undercoating or bonding layer, which are clean-to-the-touch, which produce images which are similarly clean and smear-resistant, and which produce sharp, clear images under the effects of a relatively low impact pressure, even on relatively rough copy paper stock, such images having uniform good color intensity of any desired color over the life of the transfer element.

The novel hot-melt transfer elements of the present invention represent a substantial change from prior-known conventional hot-melt transfer elements in that the present compositions are formulated so as to have high cohesive properties in order to prevent mass transfer of the solid binder material whereas prior-known hot-melt transfer elements were formulated so as to have low cohesive properties since frangibility of mass transfer was the most essential feature thereof. It is the solid wax binder materials of conventional hot-melt compositions which are colored and which constitute the colored images on fracture and transfer to the copy sheet.

The present hot-melt transfer elements also represent a substantial change form conventional hot-melt wax transfer elements with respect to the nature and properties of the oils and coloring matter contained therein. In conventional hot-melt wax carbons and ribbons, the oil(s) present therein are miscible or compatible with the wax binder material and function as softeners or plasticizers for the hard waxes to form frangible wax-in-oil solid solutions in which the dyes or pigments are dispersed uniformly throughout the wax layer, as are any other ingredients such as resins and fillers. Thus, the fragible transfer layer consists of a single, substantially homogeneous phase which is transferable to a copy sheet under the effects of imaging pressure to form images consisting of the same composition as the transfer layer.

Contrary to these essential requirements of conventional hot-melt frangible wax carbons, the present novel hot-melt wax carbons designed for repeated reuse are formulated so as to have sufficiently high cohesion to resist interior fracture and substantial solid transfer, sufficient incompatibility between the wax and oily ingredients to develop an ink phase uniformly dispersed throughout a microporous solid binder phase, selective concentration of the dye coloring matter in the ink phase, sufficient affinity between the ink and binder phases to resist migration or sweating of the ink phase to the surface, and sufficient adhesion so that the imaging layer bonds strongly to its foundation, without the need for an undercoating or bonding layer.

Moreover, contrary to the essential requirements of conventional squeeze-out carbons, the present compositions and imaging layers for formulated so as to have sufficiently high adhesion to cause surface portions of the solid binder material, both wax and resin, to stick to the copy sheet and to remain bonded thereto, with the exuded ink phase, to form the typed images. While the imaging layer is too cohesive to permit internal fracture and transfer of substantial solid portions of binder network, those surface portions of the binder network which make direct contact with and adhesion to the copy sheet under imaging pressure, even copy sheets having relatively rough surfaces, remain attached to the copy sheet and separate form the remainder of the binder network of the imaging layer in the form of continuous images. This increases the intensity and opacity of the formed images without reducing their smudge-resistance, and also permits repeated reuse of the imaging layer and formation of at least three, and generally five or more original-appearing, uniform-intensity, continuous images from the same overstruck areas since the interface bonding and transfer of solid binder material represents the transfer of only a very small amount of solid binder material with each use, i.e., the binder material is substantially nonfrangible.

The novel preferred imaging layers of the present invention comprise one or more compatible hard wax binder materials, an oleaginous ink vehicle which is normally substantially incompatible with the wax binder material and contains dyestuff soluble therein, a meltable resinous binder material which is compatible with the wax binder material to soften the imaging layer slightly and promote cohesion, and which is compatible with the oily ink vehicle to provide an affinity link between the cohesive wax-resin binder material and the ink, and which also promotes adhesion of the imaging layer for the substrate, an optional wetting agent for the ink which improves the pressure release or writing strength thereof, and a filler which absorbs little or no oleaginous material and reduces the adhesive properties of the surface of the imaging layer to a desired degree.

The following table illustrates the essential ingredients of the compositions of the present invention and the relative proportions of each in percent by weight:

TABLE

| Ingredients | Range | Preferred |
|---|---|---|
| Hard wax binder(s) | 1 | 1 |
| Fluid ink vehicle(s) | 0.2 to 0.5 | 0.25 to 0.4 |
| Meltable resin binder(s) | 0.05 to 0.35 | 0.1 to 0.25 |
| Liquid dye | 0.2 to 1.2 | 0.35 to 0.75 |
| Filler(s) | 0.1 to 0.6 | 0.25 to 0.5 |
| Wetting agent | 0 to 0.001 | 0.01 to 0.1 |

Preferred hard wax binder materials include oxidized microcrystalline hydrocarbon wax having a melting point within the range of about 180° F. to 200° F., such as cardis wax which melts between about 184°-180° F., and carnauba wax. However, other hard waxes such as montan wax, hard paraffin wax, and the like, may also be used in place of or in addition to cardis wax and/or carnauba wax provided that they are substantially incompatible with the oleaginous ink vehicle and substantially compatible with the meltable resin binder material(s) in the amounts used.

The preferred meltable resin binder materials are lower molecular weight waxy olefin polymers and copolymers having softening temperatures similar to the melting temperatures of the wax binder material, i.e., below about 220° F., which are compatible with the wax binder material in the nature of a cohesive solid solution, and which are also compatible with the oily ink vehicle so as to give the combined wax/resin binder material an affinity for the ink while avoiding the softening or plasticizing of the major portion of the binder material which is the hard wax.

The meltable resin binder materials also function as adhesion promoters since they have greater adhesion or tackiness than the hard wax, per se. In conventional frangible wax carbons the binder material is either naturally adhesive, such as paraffin wax, and/or is softened with miscible oils since the binder material is formulated to be noncohesive and frangible or pressure-transferable. This is to be avoided in the present compositions since the binder material must be maintained hard, cohesive and nonfrangible. Suitable adhesion-promoting resin binders are hydrogenated rosin, polyisobutylene, polybutenes, vinyl ethers, and the like. These more adhesive resin binders preferably are used in combination with larger amounts of less adhesive resin binders to form a compatible mixture having the desired degree of adhesion for the substrate.

The pressure-exudable inks of the present compositions comprise dyestuffs of any desired color dissolved in an oleaginous vehicle which, as stated, is substantially incompatible with the wax binder material so as to form a heterogeneous microporous binder network having an affinity for the ink.

Most preferably, the dyestuff is a chemically-combined dye-oleic acid ester which is a liquid dye. Alternatively the dyestuff or the dye-oleate can be dissolved in any suitable liquid or semi-solid oleaginous material such as rapeseed oil, castor oil, carbowax 400, lanolin, petrolatum, cetyl alcohol, stearyl alcohol, or the like. Such resin-compatible oleaginous materials are good dye-solvents, as opposed to resin-incompatible oils such as mineral oils generally used in conventional solvent-coated squeezeout carbons.

Various wetting agents may be added to the ink depending upon the specific oily ink vehicles and dyestuffs used. Their function is to improve the dispersability of the ink and form a finer microporous structure having better affinity for the ink. Wetting agents conventionally used in reusable solvent-coated transfer layers are also suitable for use according to the present invention.

Finally, the present hot-melt compositions also preferably contain an inert filler which absorbs little, if any, of the ink vehicle. Such filler preferably concentrates at the surface of the hot-melt layer before it cools and hardens, or is of sufficient mean particle size that it extends above the surface of the layer to provide a slight air space between the layer and sheets placed in contact therewith. This prevents the hot-melt layer, which is slightly adhesive, from sticking to other sheets or to the rear surface of its own foundation when transfer sheets are packaged or, in the case of ribbons, when the ribbon is wound tightly on a spool. Suitable fillers include starch, polymer sphere powders, low oil-absorption clays, and the like.

The present compositions are melted and coated onto suitable flexible foundations, most preferably plastic films such as polyethylene terephthlate, polyethylene or polypropylene in a coating thickness of between about 0.0003 inch and 0.001 inch (3 to 10 points). No undercoating or bonding layer is required. Thereafter the coated substrate is cut into sheet lengths or ribbon widths, as desired. Paper foundations can also be used, particularly papers which are impregnated or coated with an oil-barrier layer to prevent the oily ink from being absorbed from the ink layer.

The following example is formulated and heated to a temperature of about 210° F., with stirring, to form a uniform molten composition having a coatable consistency:

| Ingredients | Percent by Weight |
|---|---|
| Carnauba wax | 41.8 |
| Ethylene-vinyl acetate copolymer | 7.7 |
| Dye oleate (blue) | 17.6 |
| Dye oleate (brown) | 3.3 |
| Rapeseed oil | 9.8 |
| Carbowax 300 | 3.3 |
| Filler (clay) | 16.5 |

The uniform composition is coated directly onto thin polyethylene terephthalate film in a thickness of about 6 points (0.0006 inch) and cooled for collection on a roll and eventual cutting into sheets or ribbons, as desired.

In ribbon form, wound firmly on a spool, the present hot-melt coatings have good adhesion for the flexible foundation and for a copy sheet, during typing, but resist adhesion and blocking to adjacent convolutions on the spool, as desired.

Similarly, while the present hot-melt coatings have a sufficiently dry and nonadhesive surface to resist such adhesion when wound firmly on a spool, they have sufficient adhesion to a copy sheet, under the effects of typing pressure, to form a thin interfacial bond therewith so that the surface portions of the solid binder materials which are integrated with the porous surface of the copy sheet remain bonded thereto, together with the exuded ink, to form typed images which include not only the ink but sufficiently small amounts of the binder materials that the images are smear-resistant but also more opaque and continuous than is the case when only ink images are formed.

Variations and modifications of the present invention will be apparent to those skilled in the art within the scope of the present claims.

We claim:

1. Pressure-sensitive multiple use transfer element comprising a flexible foundation supporting a hot-melt-applied substantially nonfrangible coating containing a pressure-exudable fluid transfer ink, said coating comprising a cohesive solid binder material comprising a major amount by weight of at least one meltable hard wax and a minor amount by weight of at least one meltable synthetic resin which is adhesive and is compatible with said wax, and a fluid ink comprising at least one oleaginous vehicle which is substantially incompatible with said wax and substantially compatible with said meltable synthetic resin, and a dyestuff dissolved in said vehicle, said ink being uniformly dispersed throughout said coating in the form of ink droplets which are pressure-exudable from said coating to a copy sheet under the effects of imaging pressure, the surface of said binder material being sufficiently adhesive relative to the copy sheet to adhere thereto and transfer minor portions thereof with the exuded ink, under the effects of imaging pressure.

2. A transfer element according to claim 1 in which said synthetic resin comprises a mixture including a minor amount by weight of a highly adhesive resin which improves the bonding properties of said coating with respect to said flexible foundation.

3. A transfer element according to claim 1 in which said coating also contains a minor amount by weight of an inert filler which is not capable of absorbing substantial amounts of said oleaginous vehicle and which reduces the adhesive properties of the surface of said coating to a desired degree.

4. A transfer element according to claim 1 in which said coating also contains a minor amount by weight of a wetting agent which improves the dispersion of said ink throughout said coating.

5. Transfer element according to claim 1 comprising a binder material containing carnauba wax and a lower molecular weight olefinic polymer, an oleic acid ester ink vehicle and a dye soluble therein.

6. Transfer element according to claim 2 in which said highly adhesive resin comprises hydrogenated rosin.

7. Proces for producing a pressure-sensitive multiple use transfer element comprising the steps of producing a molten coating composition comprising a cohesive solid binder material containing a major amount by weight of at least one melted hard wax and a minor amount by weight of at least one melted synthetic resin which is adhesive and is compatible with said wax, a fluid ink comprising at least one oleaginous vehicle which is substantially incompatible with said wax and substantially compatible with said synthetic resin and a dyestuff dissolved in said vehicle, said ink being uniformly dispersed throughout said coating composition, applying said molten composition as a uniformly-thin layer to a flexible foundation, and cooling said layer to form a substantially nonfrangible cohesive layer of said binder material having said ink uniformly dispersed therethrough in the form of ink droplets which are pressure-exudable from said coating to a copy sheet under the effects of imaging pressure, the surface of said binder material being sufficiently adhesive relative to the copy sheet to adhere thereto and transfer minor portions thereof, with the exuded ink, under the effects of imaging pressure.

8. Process according to claim 7 in which said synthetic resin comprises a mixture including a minor amount by weight of a highly adhesive resin which improves the bonding properties of said coating with respect to said flexible foundation.

9. Process according to claim 8 which comprises adding to said molten coating composition a minor amount by weight of an inert filler which is not capable of absorbing substantial amounts of the oleaginous vehicle and which reduces the adhesive properties of the surface of said coating.

10. Process according to claim 7 which comprises adding to said molten coating composition a minor amount by weight of a wetting agent which improves the dispersion of said ink throughout said coating.

11. Process according to claim 7 in which said coating composition comprises a binder material including carnauba wax and a lower molecular weight olefinic polymer, an oleic acid ester ink vehicle and a dye soluble therein.

12. Process according to claim 8 in which said highly adhesive resin comprises hydrogenated rosin.

* * * * *